(12) United States Patent
Imai

(10) Patent No.: US 7,377,520 B2
(45) Date of Patent: May 27, 2008

(54) CYLINDER HEAD GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/580,113

(22) Filed: Oct. 13, 2006

(65) Prior Publication Data
US 2007/0120330 A1    May 31, 2007

(30) Foreign Application Priority Data
Nov. 30, 2005   (JP)   ............... 2005-346229

(51) Int. Cl.
*F02F 11/00*   (2006.01)
(52) U.S. Cl. ................. 277/594; 277/593
(58) Field of Classification Search ......... 277/593, 277/594
See application file for complete search history.

(56) References Cited

U.S. PATENT DOCUMENTS

| | | | | |
|---|---|---|---|---|
| 4,861,046 A | * | 8/1989 | Udagawa | 277/595 |
| 4,896,891 A | * | 1/1990 | Udagawa | 277/593 |
| 5,058,908 A | * | 10/1991 | Udagawa | 277/595 |
| 5,169,163 A | * | 12/1992 | Udagawa et al. | 277/593 |
| 5,511,796 A | * | 4/1996 | Udagawa | 277/593 |
| 5,634,646 A | * | 6/1997 | Miyaoh | 277/592 |
| 5,899,462 A | * | 5/1999 | Udagawa | 277/593 |
| 6,758,479 B2 | * | 7/2004 | Miyaoh | 277/598 |

* cited by examiner

*Primary Examiner*—Jennifer H Gay
*Assistant Examiner*—Gilbert Y Lee
(74) *Attorney, Agent, or Firm*—Manabu Kanesaka

(57) ABSTRACT

A cylinder head gasket is used for an engine having a cylinder liner and a cylinder block. The gasket includes first to third metal plates laminated together. The first metal plate includes a base portion, a curved portion, a flange extending from the curved portion, and a first damper bead formed on the base portion around a cylinder liner. The first damper bead is formed of a full bead, extends toward the flange and crosses a border portion between the cylinder liner and the cylinder block. The second metal plate is disposed over the base portion, and has an inner portion inserted between the flange and the base portion, an outer portion outside the inner portion, and a second damper bead formed on the outer portion to extend toward the first damper bead. The third metal plate is placed between the first damper bead and the second damper bead.

3 Claims, 1 Drawing Sheet

CYLINDER HEAD GASKET

BACKGROUND OF THE INVENTION AND RELATED ART STATEMENT

The present invention relates to a cylinder head gasket which is placed between two members such as a cylinder head and a cylinder block for an engine with a cylinder liner. More specifically, a cylinder head gasket is able to absorb a level difference or gap between the cylinder head and cylinder case.

The cylinder head gasket is fastened by head bolts in the state of being placed between engine members such as the cylinder head and the cylinder block (cylinder body) of an automobile engine in order to seal fluid, such as combustion gas, oil, coolant water and so on.

On the other hand, recently, with improved fuel consumption and stronger antipollution measures, the automobile engine has been reduced in size and weight. The development of this compact engine focuses on low-fuel consumption, and fuel consumption has been improved by reducing the friction resistance of the piston ring and cylinder.

As one measure, an engine with a cylinder liner having a cylinder-bore shape and being made of special cast iron which is excellent in abrasion resistance, seize resistance, heat resistance, and strength, is used. The cylinder liner is fit into an aluminum alloy cylinder case and forms a cylinder block.

There are a dry liner and a wet liner in this cylinder liner. In the case wherein the cylinder liner is the dry liner which does not contact the water jacket, there may be a case wherein the level difference or gap is generated between the upper face of the flange of the cylinder liner and the deck face of the cylinder block, i.e., in the borderline portion between the cylinder liner and the cylinder block.

In the case wherein the level difference or gap is formed, when the gap between the engine members is expanded and reduced due to vibration during the engine operation, large surface pressure is locally generated in the portion of the gasket wherein the corner portion of the level difference abuts. Since the above-mentioned surface pressure repeatedly acts on the bottom of the portion with a bead which seals the adjacent water hole of the water jacket, the bead for sealing the water hole vibrates, and repeatedly hits the engine members. Accordingly, this may cause damage in such a way as to make a hole in the contact face of the bead for sealing the water hole of the engine members. If this fretting occurs, sealing performance deteriorates, and creep relaxation of a seal portion around the water jacket occurs, so that durability deteriorates.

In relation to a cylinder head gasket for an engine with a cylinder liner, a metal gasket which is able to reduce the deformation of a combustion hole and prevents the bead from fatigue breakdown, is proposed (for example, refer to the Japanese Patent Publication 1). The purposes of the metal gasket are that, even if there is a level difference or gap at the borderline portion between the upper face of the flange of the cylinder liner and the deck face of the cylinder block, the gasket can absorb the level difference and carry out an excellent sealing performance. For this purpose, the metal gasket includes inner beads formed by half beads around the combustion holes of a first metal plate and a second metal plate respectively; and outer beads formed by full beads outside the inner beads. These beads are formed in a projection on the inside, and two sheets of the secondary plates with a level difference portion which can achieve a stopper effect in the corresponding position between the inner beads and the outer beads, are provided between the first metal plate and the second metal plate.

The metal gasket can obtain an excellent sealing performance by forming three-stage seal lines by a primary seal of the tip of a first inner bead; a secondary seal between the inner bead and the outer bead; and a tertiary seal of the outside base portion of the outer bead. Also, the level difference portion of the secondary plates produces the stopper effect of the secondary seal, and prevents the fatigue breakdown of both beads.

As a metal gasket with a similar structure, a metal gasket wherein the first metal plate and the second metal plate are provided with the full beads around the combustion hole respectively, is proposed (for example, refer to Japanese Patent Publication 2). These beads project to orient inwardly, and the secondary plates are provided between the first metal plate and the second metal plate, and between the inner bead and the outer bead.

In the metal gasket, two-stage seal lines are formed by the primary seal and the secondary seal at the inside and the outside of the bottom portion of the full beads.

In the above-mentioned two types of metal gaskets, the beads are arranged to cross the borderline (level difference) between the flange of the cylinder liner and the cylinder case, so that even if there is a level difference on the deck face of the cylinder, the gasket can follow. As a result, the sealing can be carried out excellently, and the deformation of the cylinder liner can be also reduced.

However, in the metal gasket with the above-mentioned structure, even if the beads cross the level difference of the borderline, the vibration of the engine member is applied to the bottom portion of the outer circumferential side of the beads, so that fretting might occur. Moreover, in the portion facing the combustion chamber, since the end of each constitution plate of the gasket is exposed to the combustion chamber, the combustion gas in the combustion chamber enters between the first metal plate and the second metal plate. As a result, all of the first metal plate, the second metal plate, and the secondary plates contact with high-temperature combustion gas.

Therefore, there is a possibility of producing a combustion gas leak between the above-mentioned metal plates. Also, because all of the metal plates are required to be formed by metal with heat resistance and corrosion resistance relative to the high-temperature combustion gas, the metal gasket with the metal plates with several properties cannot be combined for applying respective properties.

Patent Publication 1: Japanese Patent Publication No. TOKKAI H10-267131

Patent Publication 2: Japanese Patent Publication No. TOKKAI H11-241769

The present invention is made in order to solve the above-mentioned problem, and the purpose of the present invention is to provide a cylinder head gasket used for an engine with a cylinder liner. The cylinder head gasket can block the combustion gas from the folded portion, and be combined with the metal plates with several properties in such a way that the combustion gas does not contact the metal plates except for the metal plate with the folded portion, so that the cylinder head gasket can improve the sealing performance. Also, the cylinder head gasket can absorb the level difference of the borderline portion between the cylinder liner and the cylinder case, and the vibration of the engine members can be absorbed by a damper bead, so that fretting can be controlled. Accordingly, the cylinder head gasket can maintain high sealing performance with high durability.

Further objects and advantages of the invention will be apparent from the following description of the invention.

SUMMARY OF THE INVENTION

In order to attain the object described above, according to the present invention, the cylinder head gasket includes a first metal plate including a folded portion and a first damper bead around a cylinder bore of an engine with a cylinder liner; a second metal plate, one part of which is inserted into the folded portion, and including a second damper bead on the outer circumferential side compared to the folded tip portion of the folded portion; and a third metal plate placed between the first damper bead and the second damper bead. The first damper bead and the second damper bead are opposed to each other by full-bead with projections facing inward, and are formed in a position of crossing a level difference of the borderline portion between the cylinder liner and cylinder case. The base portion of the inside of the second damper bead of the second metal plate is formed in a V shape, and inserted into the folded portion.

Therefore, the first damper bead and the second damper bead are formed by full beads whose main purpose is to absorb vibration energy of the engine members rather than sealing performance. Accordingly, for the elasticity of the bead, the shape and size are set to provide the absorption of the vibration energy rather than sealing performance.

According to the structure, since the inner circumferential side and the outer circumferential side of the base portion of the second damper bead are placed by crossing the level difference or gap of the borderline portion between the cylinder liner and the cylinder case, i.e., the level difference portion, the level difference of the borderline portion between the cylinder liner and the cylinder case can be absorbed at the first damper bead and the second damper bead.

Also, the base portions of the first damper bead and the second damper bead contact the engine members, and receive the vibration of the engine members. However, the above-mentioned damper beads function as a damper, absorb the vibration energy, and prevent the vibration from transmitting to other part of the gasket.

More specifically, the vibration of the liner adjacent portion increases due to the level difference between the cylinder liner and the cylinder case, and according to the vibration, the seal of a bore or a water hole becomes impaired due to the increase of creep relaxation of the bead or abrasion of coating. However, since the damper beads are provided, the vibration energy is absorbed by the same spring function as an automobile suspension. Accordingly, the vibration and seal deterioration due to the vibration are reduced.

Moreover, since the inner side base portion of the second damper bead is formed in a V shape, and a portion formed in the V shape is placed inside the folded portion, elasticity of the folded portion can be enforced. Also, since the distance between the inner side base portion of the second damper bead and the folded portion can be deduced by forming in the V shape, the insertion length of the second metal plate inside the folded portion can be enlarged. According to this structure, even if the width of the guard portion of the cylinder liner is narrow, an insertion portion which is a part of the second metal plate can be inserted into the folded portion. Accordingly, the elasticity of the folded portion can be improved and crack can be prevented.

Also, a major seal of the cylinder bore is formed by the folded portion wherein the insertion portion of the second metal plate is inserted. However, since the inner circumferential side and the outer circumferential side of the base portion of the first damper bead and the second damper bead can form a secondary seal, sealing performance can be improved.

According to the structure, since combustion gas can be prevented from contacting the second metal plate or the third metal plate by the folded portion, materials with excellent heat resistance or corrosion resistance can be used for the first metal plate and the third metal plate, and materials with excellent elasticity can be used for the second metal plate, so that the gasket can be constituted by a combination which makes good use of respective material properties. Therefore, the gasket can be excellent with each property such as sealing performance, heat resistance, corrosion resistance, and durability.

Otherwise, in order to attain the object described above, according to the present invention, the cylinder head gasket includes the first metal plate including the folded portion and the first damper bead around the cylinder bore of the engine with the cylinder liner; the second metal plate, one part of which is inserted into the folded portion, and including the second damper bead on the outer circumferential side compared to the folded tip portion of the folded portion; and a third metal plate placed between the first damper bead and the second damper bead. The first damper bead is formed by the full bead, and the second damper bead is formed by the half bead. The first damper bead is formed in the position of crossing the level difference or gap of the borderline portion between the cylinder liner and the cylinder case. Also, the outer circumferential side of the second damper bead is formed in the position outside the borderline portion, and the inside of the second damper bead of the second metal plate is inserted into the folded portion.

According to the structure, since the second damper bead is formed by the half bead and not by the full bead, the absorption effect of the vibration energy is slightly reduced. Also, the effect of forming the base portions of the inside of the second damper bead in the V-shape, can not work. However, since the second damper bead is formed by the half bead, the inside portion of the second damper bead can be easily placed inside the folded portion. Accordingly, even if the width of the guard portion of the cylinder liner is narrow, since one portion of the second metal plate can be inserted into the folded portion, the elasticity of the folded portion can be improved, and cracking can be prevented by the stopper function of the insertion portion.

In the cylinder head gasket, if the first half bead and the second half bead which are opposed to each other with projections facing inward, are respectively provided in the portions of sealing the water hole of the first metal plate and the second metal plate, the water hole, especially, the water hole of the water jacket can be sealed by the half bead, and the first damper bead and the second damper bead play a role for absorbing the level difference of the borderline portion between the cylinder liner and the cylinder case. As a result, fretting of the water hole portion can be controlled, and durability of the water hole seal portion can be improved.

According to the present invention, since the second damper bead is placed by crossing the level difference of the borderline portion between the cylinder liner and the cylinder case, the second damper bead can absorb the level difference, and the fretting of the water hole portion due to the vibration of the engine operation can be controlled by absorbing the vibration energy at the first and second damper beads, so that the durability of the water hole seal portion can be ensured.

Moreover, since the base portion of the inside of the second damper bead is formed in the V shape, even if the width of the guard portion of the cylinder liner is narrow, one portion of the second metal plate can be inserted into the folded portion, so that the elasticity of the folded portion can be improved and the crack can be prevented.

Also, the major seal is formed in the folded portion wherein the second metal plate is inserted into, and the secondary seal can be formed by the inner circumferential side and the outer circumferential side of the base portions of the first damper bead and the second damper bead. As a result, sealing can be carried out with high sealing performance.

DETAILED DESCRIPTION OF THE EMBODIMENTS

Hereinafter, embodiments of the cylinder head gasket of the present invention will be described with reference to FIGS. 1, 2. Incidentally, FIGS. 1, 2 are schematic explanatory views in which the size of a cylinder bore, and the size and a shape of a cylinder liner, water hole, and beads are different from actual ones, and enlarged for the sake of explanation.

Figure 1:
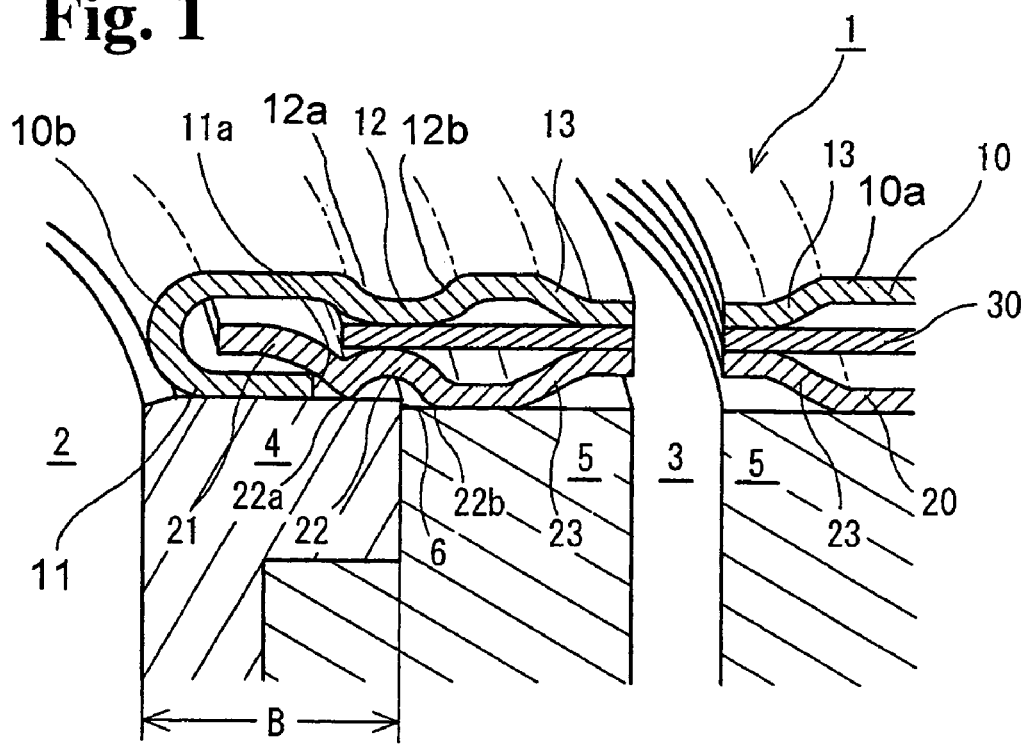
FIG. 1 is a fragmentary perspective view showing a cylinder head gasket of a first embodiment according to the present invention.
Figure 2:
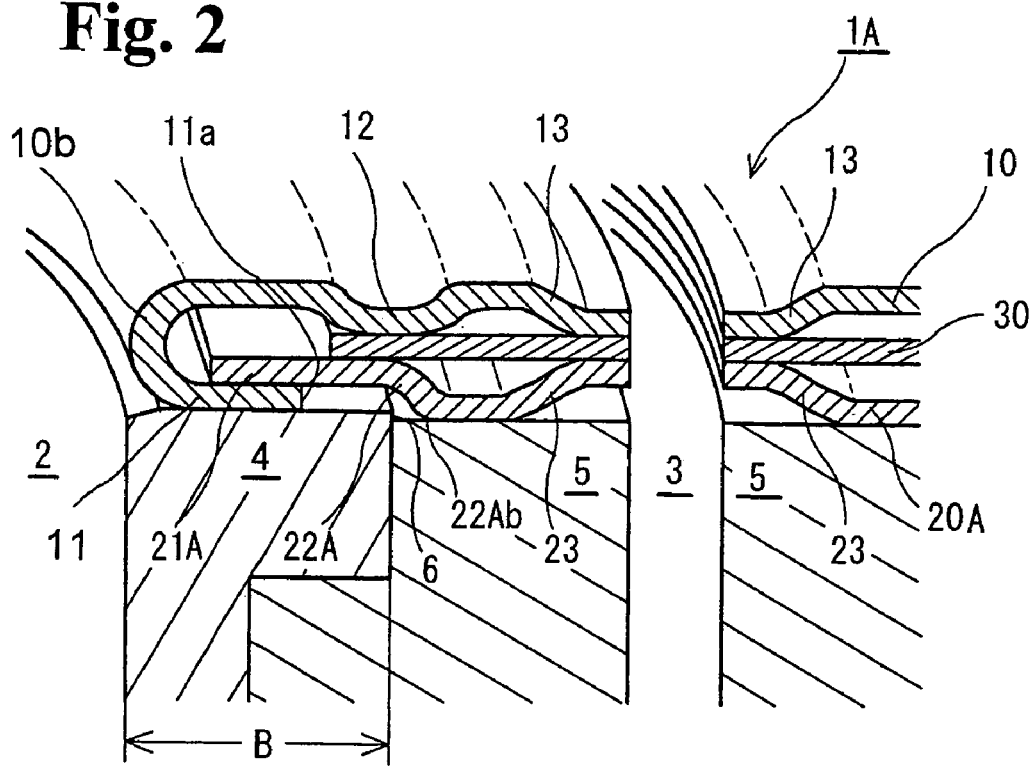
FIG. 2 is a fragmentary perspective view showing the cylinder head gasket of a second embodiment according to the present invention.

Cylinder head gaskets 1, 1A of the first and second embodiments in FIGS. 1, 2 are metal gaskets placed between engine members of a cylinder head and a cylinder block (cylinder body) of an engine with a cylinder liner for a multi-cylinder engine. The cylinder head gaskets 1, 1A seal high temperature and high pressure combustion gas in a cylinder bore, and liquid such as coolant water and oil in a coolant water passage and a coolant oil passage.

In the engine with the cylinder liner wherein the cylinder head gaskets 1, 1A are used, a cylinder liner 4 with a cylinder bore 2 formed therein is fitted into a cylinder case (cylinder casing) 5. Also, in the cylinder case 5, a water hole 3 such as a water jacket is provided. The cylinder liner 4 is made of special cast iron which is excellent in abrasion resistance, seize resistance, heat resistance, and strength. The cylinder case 5 is formed by an aluminum alloy which is excellent in weight.

At first, the cylinder head gasket 1 of the first embodiment shown in FIG. 1 will be explained. The cylinder head gasket 1 is composed of first-third metal plates (metal substrates: metal-configured boards) 10, 20, 30. The first-third metal plates 10, 20, 30 are formed by a soft steel board, stainless anneal (annealed material), and stainless material (spring steel board). Especially, for the first metal plate 10 and the third metal plate 30, the annealed material which is excellent in heat resistance and corrosion resistance, is used. For the second metal plate 20, a spring material which is excellent in elasticity is used.

Also, the metal plates 10, 20, 30 are manufactured to fit the shape of the engine members such as the cylinder block and so on, and includes a cylinder bore (combustion hole) 2, a water hole 3 for the coolant water circulation, an oil hole (not shown in the figures) for lubricating oil circulation, and head bolt holes (not shown in the figures) for tightening head bolts.

The first metal plate 10 includes a base portion 10a, a curved portion 10b, a folded portion or flange 11 formed around the cylinder bore 2 and defined by the curved portion 10b; a first damper bead 12 formed by a full bead on the outer circumferential side relative to a tip portion 11a of the folded portion 11; and a first half bead 13 formed around the water hole 3. A part of the second metal plate 20 is inserted into the inside of the folded portion 11. The first damper bead 12 projects toward the folded portion 11, and the first half bead 13 projects toward the folded portion 11, i.e., the side of the tip portion 11a of the folded portion 11.

Incidentally, the first damper bead 12 is a bead whose main purpose is to absorb vibration energy of the engine members rather than sealing performance. Accordingly, the shape, size, and elasticity of the bead 12 are set to provide the absorption of the vibration energy rather than the sealing performance.

Also, the second metal plate 20 is configured by an insertion (inner portion) portion 21 inserted into the folded portion 11 of the first metal plate 10; a second damper bead 22 formed by the full bead radially outside the tip portion 11a (outer portion) of the folded portion 11; and a second half bead 23 formed around the water hole 3. The second damper bead 22 is provided in such a way to oppose the first damper bead 12 so that the projections of the full beads of the second damper bead 22 and the first damper bead 12 face each other. The second half bead 23 is provided to oppose the first half bead 13 and project to the first half bead 13 side.

Incidentally, since the second damper bead 22 is a bead whose main purpose is to absorb the vibration energy of the engine members rather than sealing performance, the shape, size, and elasticity of the bead 22 are set to especially provide the absorption of the vibration energy rather than sealing performance.

A base portion 22a on the inner side of the second damper bead 22 of the second metal plate 20 is formed to have a V-shape. The insertion portion 21 with the above-mentioned curved portion is inserted into the folded portion 11.

The first damper bead 12 and the second damper bead 22 are formed in the position of crossing the level difference or gap 6 of a borderline portion between the cylinder liner 4 and the cylinder case 5. More specifically, the inner circumferential side 22a and an outer circumferential side 22b of the base portion of the second damper bead 22 are provided by crossing the level difference 6 which is the level difference of the borderline portion between the cylinder liner 4 and the cylinder case 5. The level difference 6 of the borderline portion between the cylinder liner 4 and the cylinder case 5 can be absorbed by the first damper bead 12 and the second damper bead 22.

Although the base portions of the first damper bead 12 and the second damper bead 22 contact the engine members and receive the vibration of the engine members, the damper beads 12, 22 can function as a damper, absorb the vibration energy, and prevent the vibration from propagating to the other part of the gasket.

Since the base portion 22a on the inside of the second damper bead 22 is formed in a V-shape to strengthen the elasticity of the base portion 22a, supplement sealing performance of the base portion 22a can be improved. Also, even if a width B of a guard portion of the cylinder liner 5 is narrow, one portion 21 of the second metal plate 20 can be inserted into the folded portion 11, so that the elasticity of the folded portion 11 can be improved, and cracking can be prevented by the stopper function of the insertion portion 21.

Furthermore, since the insertion portion 21 with the V-shaped curved portion is held inside the folded portion 11, the elasticity of the folded portion 11 can be strengthened more than the case wherein the insertion portion 21 is formed by a flat plate. Accordingly, the sealing performance of a major seal being formed by the folded portion 11 can be improved.

Also, the third metal plate 30 is placed between the first damper bead 12 and the second damper bead 22, and between the first half bead 13 and the second half bead 23.

According to the structure, the major seal line of the cylinder bore is formed by the folded portion wherein the second metal plate is inserted, and a supplement seal line is formed by the inner circumferential sides 12a, 22a and the outer circumferential sides 12b, 22b of the base portions of the first damper bead 12 and the second damper bead 22. Therefore, high-temperature combustion gas can be sealed and blocked at the folded portion 11 of the major seal line, and the sealing performance can be improved furthermore at the supplement seal line on the outer circumferential side.

According to the structure, since the folded portion 11 can prevent the combustion gas from contacting the second metal plate 20 and the third metal plate 30, the gasket 1 can be constituted by the combination which makes good use of respective material properties. Therefore, a gasket with excellent sealing performance, heat resistance, corrosion resistance, and durability can be obtained.

Next, the cylinder head gasket 1A of the second embodiment shown in FIG. 2 will be explained. The cylinder head gasket 1A includes first-third metal plates 10, 20A, 30 as in the cylinder head gasket 1 of the first embodiment. However, a second damper bead 22A is not the full bead, but half bead. The cylinder head gasket 1A is constituted in such a way that an outer circumferential side 22Ab of the second damper bead 22A is located on the outside of a borderline portion 6 and that an insertion portion 21A of the inside of the second damper bead 22A of the second metal plate 20A is inserted into the folded portion 11. The other structure is the same as that of the cylinder head gasket 1 of the first embodiment.

According to the structure, since the second damper bead 22A is formed by the half bead and not by the full bead, the absorption effect of the vibration energy is slightly reduced. Also, the effect to lift the base portion of the inside of the second damper bead 22 in the V-shape, can not work. However, since the second damper bead 22A is formed by the half bead, the insertion portion 21A of the second damper bead 22A can be easily placed inside the folded portion 11. Accordingly, even if the width B of the flange of the cylinder liner 4 is narrow, since one portion 21A of the second metal plate 20A can be inserted into the folded portion 11, the elasticity of the folded portion 11 can be improved, and cracking can be prevented by the stopper function of the insertion portion.

The disclosure of Japanese Patent Application No. 2005-346229 filed on Nov. 30, 2005 is incorporated as a reference.

While the invention has been explained with reference to the specific embodiments of the invention, the explanation is illustrative and the invention is limited only by the appended claims.

What is claimed is:

1. A combination of a cylinder head gasket and an engine having a cylinder liner and a cylinder block, said cylinder head gasket comprising:

a first metal plate having a base portion, a curved portion extending from the base portion to define a cylinder bore, a flange extending from the curved portion to be located over a part of the base portion, and a first damper bead formed on the base portion around the cylinder liner, said first damper bead being formed of a full bead, extending toward the flange and crossing a border portion between the cylinder liner and the cylinder block, a second metal plate disposed over the base portion, and having an inner portion inserted between the flange and the base portion, an outer portion outside the inner portion and the flange, and a second damper bead formed on the outer portion, extending toward the first damper bead and crossing a border portion between the cylinder liner and the cylinder block, and a third metal plate interposed between the first damper bead and the second damper bead.

2. A combination according to claim 1, wherein said second damper bead is a full bead opposing the first damper bead to cross the border portion.

3. A combination according to claim 1, wherein said second damper bead has one base portion at a side close to the flange, said one base portion being located on the cylinder liner and having a V-shape, and another portion located on the cylinder block so that the second damper bead crosses the border portion while projecting toward the base portion of the first metal plate, said inner portion extending from the one base portion and inclined relative to the flange.

* * * * *